United States Patent
Tulyani et al.

(10) Patent No.: US 9,221,720 B2
(45) Date of Patent: *Dec. 29, 2015

(54) DENSE PROTECTIVE COATINGS, METHODS FOR THEIR PREPARATION AND COATED ARTICLES

(75) Inventors: Sonia Tulyani, Manchester, CT (US); Tania Bhatia, Middletown, CT (US); John G. Smeggil, Simsbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 1146 days.

This patent is subject to a terminal disclaimer.

(21) Appl. No.: 11/366,901

(22) Filed: Mar. 1, 2006

(65) Prior Publication Data

US 2010/0119718 A1 May 13, 2010

(51) Int. Cl.
| | | |
|---|---|---|
| *B05D 3/02* | (2006.01) | |
| *C04B 41/89* | (2006.01) | |
| *C04B 41/00* | (2006.01) | |
| *C04B 41/52* | (2006.01) | |
| *C23C 26/00* | (2006.01) | |
| *F01D 5/28* | (2006.01) | |
| *C23C 28/04* | (2006.01) | |

(52) U.S. Cl.
CPC .............. *C04B 41/89* (2013.01); *C04B 41/009* (2013.01); *C04B 41/52* (2013.01); *C23C 26/00* (2013.01); *C23C 28/042* (2013.01); *F01D 5/288* (2013.01); *F05D 2230/90* (2013.01); *F05D 2300/611* (2013.01); *Y02T 50/672* (2013.01); *Y10T 428/13* (2015.01)

(58) Field of Classification Search
USPC ...................................................... 427/376.2
See application file for complete search history.

(56) References Cited

U.S. PATENT DOCUMENTS

| | | | | |
|---|---|---|---|---|
| 4,904,411 | A | * | 2/1990 | Novich et al. .................... 516/33 |
| 5,106,502 | A | * | 4/1992 | Goldsmith ..................... 210/490 |
| 5,484,980 | A | * | 1/1996 | Pratt et al. ................. 219/121.65 |
| 5,840,433 | A | | 11/1998 | Juma |
| 6,294,261 | B1 | | 9/2001 | Sangeeta et al. |
| 6,387,456 | B1 | | 5/2002 | Eaton, Jr. et al. |
| 6,902,836 | B2 | | 6/2005 | Eaton et al. |
| 7,001,679 | B2 | | 2/2006 | Campbell et al. |
| 2004/0192536 | A1 | | 9/2004 | Bryden |
| 2004/0244910 | A1 | * | 12/2004 | Albrecht et al. .......... 156/345.11 |

(Continued)

FOREIGN PATENT DOCUMENTS

| | | |
|---|---|---|
| JP | 2001226759 | 8/2001 |
| WO | 2007073983 | 7/2007 |

OTHER PUBLICATIONS

James S. Reed "Principles of Ceramic Processing" 2nd ed. John Wiley& Sons Inc. New York, NY (c) 1995, p. 594-605.*

(Continued)

*Primary Examiner* — Nathan Empie
(74) *Attorney, Agent, or Firm* — Bachman & LaPointe, P.C.

(57) ABSTRACT

A method for depositing a protective coating on a complex shaped substrate includes the steps of: (1) dipping a complex shaped substrate into a slurry to form a base coat thereon, the slurry comprising an aqueous solution, at least one refractory metal oxide, and at least one transient fluid additive present in an amount of about 0.1 percent to 10 percent by weight of the slurry; (2) curing the dipped substrate; (3) dipping the substrate into a precursor solution to form a top barrier coat thereon; and (4) heat treating the dipped, cured substrate to form a protective coating.

19 Claims, 3 Drawing Sheets

(56) References Cited

U.S. PATENT DOCUMENTS

| | | |
|---|---|---|
| 2005/0249977 A1 | 11/2005 | Hisamatsu et al. |
| 2006/0021731 A1* | 2/2006 | Strangman et al. ............ 164/138 |
| 2006/0029733 A1 | 2/2006 | Bhatia et al. |
| 2006/0086077 A1* | 4/2006 | Skoog et al. ................... 60/39.5 |
| 2006/0099358 A1* | 5/2006 | Raybould et al. ............ 428/34.1 |
| 2009/0302021 A1 | 12/2009 | Koehne et al. |

OTHER PUBLICATIONS

Glen H. Kirby et al., Tailored Rheological Behavior of Mullite and BSAS Suspensions Using a Cationic Polyelectrolyte, Proceedings of GT2005, ASME Turbo Expo 2005, Reno-Tahoe, Nevada, pp. 1-7.

Chang-Jiu Li et al., Performance of YSZ Electrolyte Layer Deposited by Atmospheric Plasma Spraying for Cermet-Supported Tubular SOFC, 2004 Elsevier Ltd., pp. 699-703.

Chang-Jiu Li et al., Effect of Densification Processes on the Properties of Plasma-Sprayed YSZ Electrolyte Coatings for Solid Oxide Fuel Cells, 2004 Elsevier Ltd., pp. 1-5.

D.R. Clarke and C.G. Levi, Materials Design for the Next Generation Thermal Barrier Coatings, Annual Review of Materials Research, Apr. 18, 2003, pp. 383-417, vol. 33.

EP Search Report for European Patent Application No. EP06256471, dated May 4, 2010.

* cited by examiner

DENSE PROTECTIVE COATINGS, METHODS FOR THEIR PREPARATION AND COATED ARTICLES

U.S. GOVERNMENT RIGHTS

The Government may have rights in the present invention pursuant to Contract No. DE-FC26-00CH11060 awarded by the Department of Energy.

FIELD OF USE

The present disclosure relates to environmental barrier coatings and, more particularly, relates to a cost effective process for preparing and applying dense environmental barrier coatings effective at limiting the diffusion of water vapor and providing extended service life of complex shaped parts in all applicable industries.

BACKGROUND OF THE INVENTION

Silicon based structural ceramics such as CMCs, monolithic SiC and $Si_3N_4$ require protective coatings to prevent recession in water vapor rich combustion environments encountered in advanced gas turbines. In order to enhance the performance and life of such components, it is essential to use protective coatings known as environmental barrier coatings (EBCs). While a large number of patents and patent applications describe EBC compositions, there is a relative scarcity of methods directed to applying such protective coatings to complex shaped parts. Various industries employ complex shaped parts. One such industry is aircraft manufacturers and their gas turbine engine components having complex part shapes such as integral vane rings and integrally bladed rotors.

Suitable coating processes for such complex shaped parts must provide thick, dense coatings at a low cost and rapid production rate. Both plasma spraying and physical vapor deposition processes are line of sight processes that are not practical for rapidly coating complex geometries. A non-line of sight process often used to provide dense coatings is chemical vapor deposition ("CVD"). Although this technique provides thick, dense coatings, CVD processes are expensive, slow and require a great deal of process development and operator skill.

Recently, a coating process involving electrophoretic deposition ("EPD") as a non-line of sight method was disclosed U.S. patent application Ser. No. 10/914,925, filed on Aug. 9, 2004 and assigned to the assignee of reference in the present application, United Technologies Corporation. However, EPD includes certain manufacturing drawbacks which diminish the process' commercial appeal. EPD processes require an electrically conductive substrate and a complex electrode design to deposit uniform coating(s) upon the substrates.

Another coating process involves sol-gel. Sol-gel processes are often used to coat substrates possessing complex geometries. Sol-gel processes produce dense coatings in a rapid and inexpensive manner. However, sol-gel processes produce dense coatings having a thickness of only a few microns, which is makes the process unsuitable where the coating must be thick and dense enough to withstand exposure to harsh environmental conditions.

Consequently, there exists a need for a cost effective process for preparing and applying dense environmental barrier coatings effective at limiting the diffusion of water vapor and providing extended service life of complex shaped parts in all applicable industries.

SUMMARY OF THE INVENTION

In accordance with the present invention, a method for depositing a protective coating on a complex shaped substrate broadly comprises the steps of (1) dipping a complex shaped substrate into a slurry to form a base coat thereon, the slurry comprising an aqueous solution, at least one refractory metal oxide, and at least one transient fluid additive present in an amount of about 0.1 percent to 10 percent by weight of the slurry; (2) curing the dipped substrate; (3) dipping the substrate into a precursor solution to form a top barrier coat thereon; and (4) heat treating the dipped, cured substrate to form a protective coating.

It is contemplated that the aforementioned steps may be performed in succession or in various orders such as performing steps (1) and (3) one or more times prior to performing step (2).

In accordance with another aspect of the present invention, an article coated in accordance with a process broadly comprises the steps of (1) dipping an article into a slurry to form a base coat, the slurry comprising an aqueous solution, at least one refractory metal oxide, and at least one transient fluid additive present in an amount of about 0.1 percent to 10 percent by weight of the slurry; (2) curing the dipped article; (3) dipping the article into a precursor solution to form a top barrier coat thereon; and (4) heat treating the dipped, cured article to form a protective coating.

In accordance with yet another aspect of the present invention, a coating composition broadly comprises a reaction product of at least one refractory metal oxide and a transient fluid additive, wherein the reaction product comprises a thermal conductivity value range of about 0.5 W/mK to about 6 W/mK.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

The present invention relates to an article comprising a silicon substrate and a top barrier layer, wherein the top barrier layer inhibits the formation of gaseous species of silicon when the article is exposed to a high temperature, aqueous environment. The invention also relates to a method for producing the aforesaid article. In addition, it should be appreciated that while the top layer is particularly directed to an environmental barrier layer, the top layer may also function as a thermal barrier layer and thus the present invention broadly encompasses the use of environmental/thermal top barrier layers on silicon containing substrates.

Figure 1:
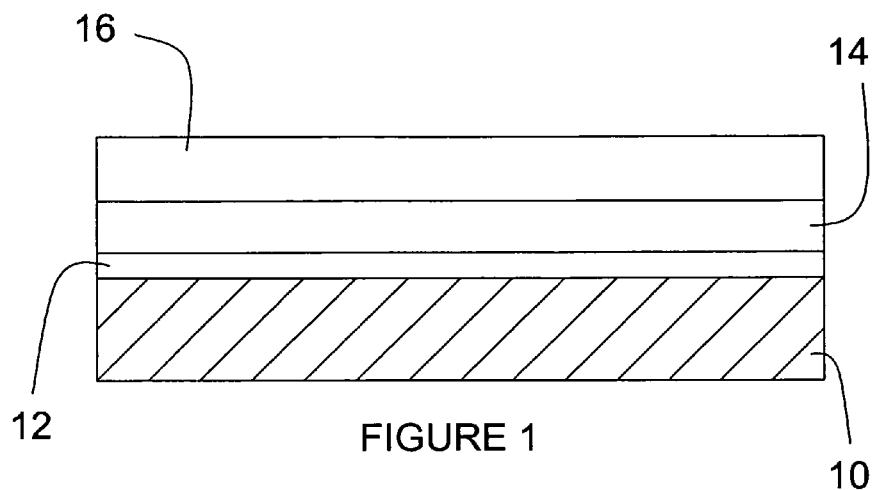
FIG. 1 is a representation of a portion of a substrate coated with a bond coat, intermediate layer and a top barrier coat.
Figure 2:
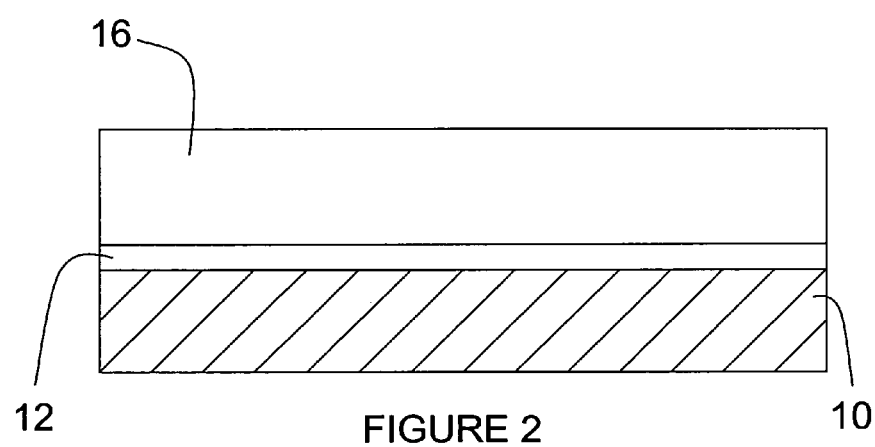
FIG. 2 is a representation of a portion of a substrate coated with a bond coat and a top barrier coat.
Figure 3:
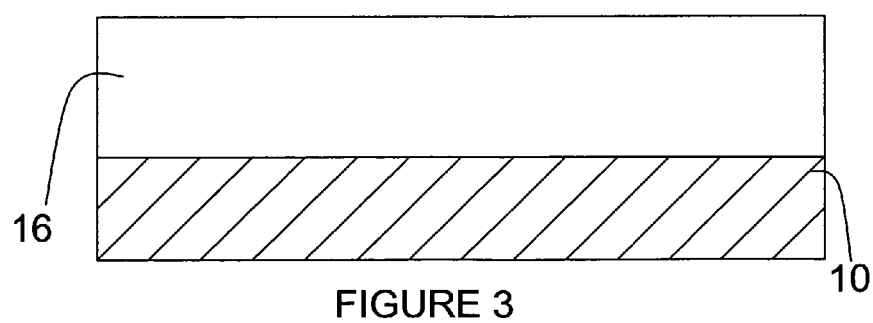
FIG. 3 is a representation of a portion of a substrate coated with a top barrier coat.

Referring to FIGS. 1-3, the silicon containing substrate may comprise a silicon-based ceramic substrate 10. In a preferred embodiment, the silicon containing substrate may be a silicon containing ceramic material as, for example, silicon carbide and silicon nitride. In accordance with a particular embodiment of the present invention, the silicon containing ceramic substrate 10 may comprise a silicon containing matrix with reinforcing materials such as fibers, particles and the like and, more particularly, a silicon based matrix which is fiber-reinforced. In another embodiment of the invention, the silicon containing ceramic substrate 10 may be monolithic silicon carbide or silicon nitride.

A top barrier coat layer 16 of the present invention which is particularly useful in the article of the present invention may comprise about 25 to 100 mol % of a refractory metal oxide, for example, hafnium oxide with a preferred range of about 75 to 100 mol %. In accordance with a preferred embodiment, monoclinic hafnium oxide is preferred. In a particular embodiment, the top barrier coat layer 16 may further comprise no more than about 75 mol %, with a preferred range of no more than about 25 mol %, of at least one refractory metal oxide having a metal selected from the group consisting of Zr, Ti, Nb, Ta, Ce and mixtures thereof, balance hafnium oxide. In a further embodiment, the top barrier coat layer 16 may comprise no more than about 75 mol %, with a preferred range of no more than about 25 mol %, of at least one refractory metal oxide having a metal selected from the group consisting of rare earth elements, Y, Sc, Al, Si and mixtures thereof, balance hafnium oxide. In yet another embodiment, the top barrier coat layer 16 may comprise no more than about 75 mol %, with a preferred range of no more than about 25 mol %, of at least one oxide selected from the group consisting of rare earth elements, Y, Sc and mixtures thereof; and balance hafnium oxide. Particularly useful rare earth elements mentioned above may include, but are not limited to, La, Gd, Sm, Lu, Yb, Er, Pr, Pm, Dy, Ho, Eu and mixtures thereof.

Top barrier coat layer 16 may be present in the article at a thickness of about 20 micrometers to 150 micrometers, preferably between about 40 micrometers to 100 micrometers, and ideally between about 50 micrometers to 75 micrometers. In a further embodiment of the article of the present invention, an intermediate coat layer 14 may be provided between the silicon containing substrate and the top barrier coat layer. One or more intermediate coat layer(s) 14 may serve(s) to provide enhanced adhesion between the top barrier coat layer 16 and the substrate 10 and/or to prevent reactions between the top barrier coat layer 16 and the substrate 10. The optional intermediate coat layer 14 may include, for example, a layer selected from the group consisting of $HfSiO_4$, $BaSiO_2$, $SrSiO_2$, aluminum silicate, yttrium silicate, rare earth silicates, mullite, alkaline earth aluminosilicates of barium strontium, and mixtures thereof. The intermediate coat layer 14 may also include of a mixture of Si and $HfO_2$ and/or $HfSiO_4$. The thickness of the intermediate layer is typical to those described above with regard to the top barrier coat layer 16. In addition to the intermediate coat layer 14, an optional bond coat layer 12 may be provided between the silicon containing substrate 10 and the top barrier coat layer 16 or, if used, the intermediate coat layer 14. A suitable bond coat layer 12 may comprise silicon metal in a thickness of about 25 microns to 100 microns, and preferably between about 40 microns to 60 microns. Another manifestation of the bond coat layer 12 could include a mixture of Si and $HfO_2$ and/or $HfSiO_4$.

Figure 4A:
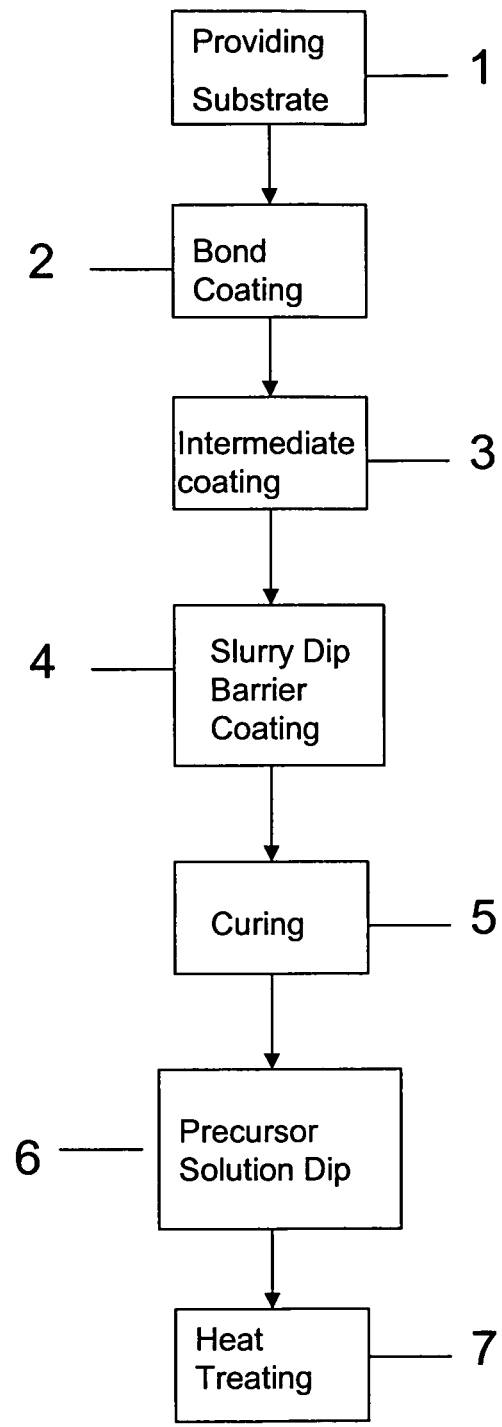
FIG. 4A is a flow chart depicting one method for depositing a protective coating on a complex shaped substrate.
Figure 4B:
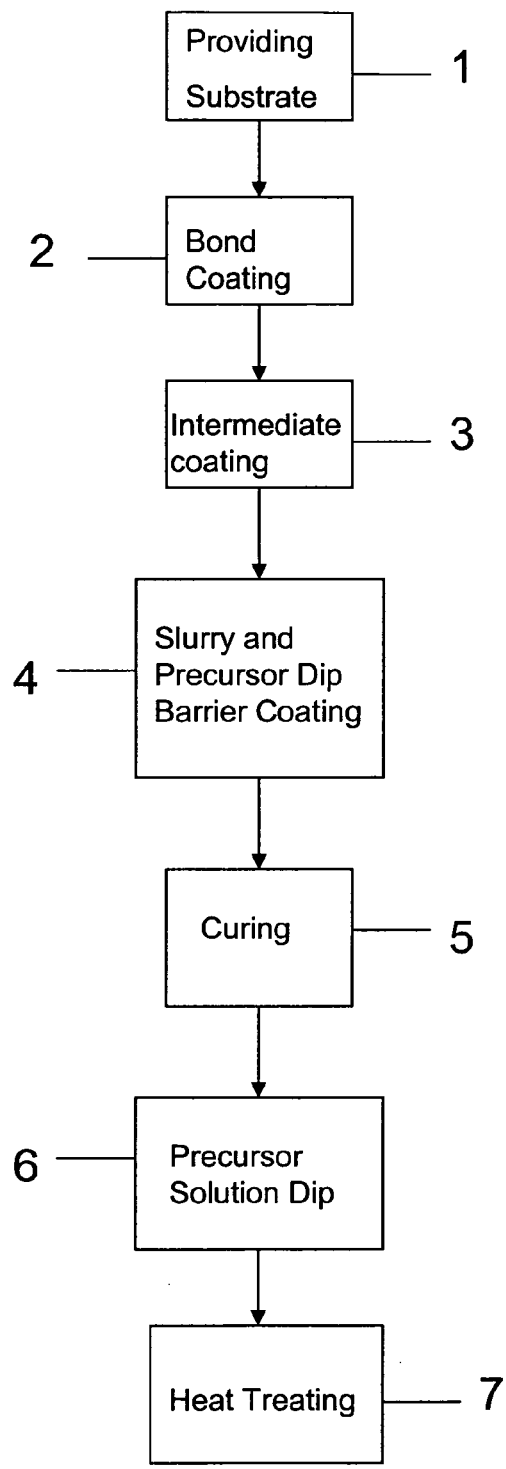
FIG. 4B is a flow chart depicting an alternative method for depositing a protective coating on a complex shaped substrate.

Referring now to FIGS. 4A and 4B, two non-limiting methods for applying the protective coatings described herein improve the overall adhesion and uniformity of the protective coatings upon the substrate. For purposes of illustration, and not to be taken in a limiting sense, the method may be described in a series of steps, some of which may be optional, and whose order may be changed dependent upon factors such as, but not limited to, the intended application, process conditions, and the like.

In one embodiment described herein, the method generally comprises providing a silicon containing substrate 10 as described above and shown at step 1 in FIG. 4A. The substrate 10 may include an optional bond coat layer 12, if necessary, disposed upon the substrate 10 as shown at step 2 in FIG. 4A. The optional intermediate coat layer 14 may be disposed upon the optional bond coat layer 12, if present, as shown at step 3 in FIG. 4A.

The optional bond coat layer 12 may be applied to the silicon containing substrate 10 by any suitable manner known in the art, such as, but not limited to, thermal spraying, slurry coating, vapor deposition (chemical and physical), combinations comprising at least one of the foregoing methods, and the like. The optional intermediate coat layer 14 may also be applied to the silicon containing substrate 10 or optional bond coat layer 12 by these same methods, and combinations, as known in the art.

The top barrier coat layer 16 may preferably be applied upon the intermediate coat layer 14, if present, using a slurry dip coating technique as shown at step 4 in FIG. 4A. The slurry dip coating technique may generally comprise dipping the silicon containing substrate 10, with or without the optional bond coat and intermediate coat layers 12 and 14, into a slurry. The slurry may comprise an aqueous solution, a source of an oxide of a rare earth element, a dispersing agent and optionally a transient fluid additive. The aqueous solution may comprise any fluid compatible with the source of the oxide of the rare earth element, transient fluid additives and the silicon containing substrate and its layers such as a solution comprising a rare earth element and their oxides such as, but not limited to, La, Gd, Sm, Lu, Yb, Er, Pr, Pm, Dy, Ho, Eu and mixtures thereof. Preferably, a solution may comprise at least hafnium oxide having an average particle size of about 0.4 micrometers to about 1.5 micrometers. The aqueous solution may also serve as the source of the oxide of a rare earth element, for example, hafnium oxide and/or a precursor salt may be included. In the alternative, one of the aforementioned rare earth elements may be added to the aqueous solution which reacts to form the source of the oxide of the rare earth metal.

The dispersing agents may comprise polyethylenimine (PEI) or polyacrylic acid, commercially available as DARVAN® from R.T. Vanderbilt Company, Norwalk, Conn., or combinations comprising at least one of the foregoing dispersing agents, and the like. The dispersing agent may comprise no more than about 50 percent by weight of the slurry, and preferably no more than about 5 percent by weight of the slurry. In particular, the combination of PEI in an aqueous solution containing hafnium oxide leads to protective coatings that exhibit improved rheological behavior over protective coatings of the prior art.

The slurry may also comprise a transient fluid additive. Transient fluid additives are used to promote grain growth and eliminate the formation of pores between grains. It has been discovered that adding the additives described below eliminate pore formation and promote grain growth allowing for improved adhesion. The transient fluid additives may generally comprise a source of silica or titania. Such silica and titania sources may include, but are not limited to, a precursor solution, a colloid, a suspension, a powder, and the like. Representative sources of silica include, but are not limited to, silicon oxide, lithium silicate, fumed silica powder, colloidal silica, combinations comprising at least one of the foregoing, and the like. Whether silica or titania is employed, it is recognized that the particle size can influence positively the adhesion between the layers, for example, between the top barrier layer and the optional intermediate layer or optional bond coat or silicon containing substrate. The transient fluid additive may comprise about 0.1 percent to about 10 percent by weight of the slurry, and preferably about 0.5 percent to about 8 percent by weight of the slurry, and most preferably about 1 percent to about 5 percent by weight of the slurry. In the case of using lithium silicate as the transient fluid additive and hafnium oxide as the source of the oxide of a rare earth element, for example, lithium silicate decomposes to form silicon oxide that reacts with the hafnium oxide forming a layer of hafnium silicate between the grains of hafnium oxide as well as between the hafnium oxide and silicon.

The silicon containing substrate, and optional bond coat layer 12 and intermediate coat layer 14, may be dipped into the slurry to form a base coat of the intended top barrier coat 16 as shown at step 4 in FIG. 4A. Once the base coat forms, the coated substrate may be cured at a temperature of about 1250° C. to about 1450° C., and preferably at a temperature of about 1350° C., for about 30 minutes to about 500 minutes, and preferably for about 300 minutes. Once cured, steps 4 and 5 of FIG. 4A may be repeated to deposit a second and successive layer(s) of top barrier coating material upon the first layer of top barrier coating.

After curing the coated substrate as shown at step 5 of FIG. 4A, the substrate may be dipped into a precursor solution as shown at step 6 in FIG. 4A. The precursor solution may comprise a salt of a rare earth element such as, but not limited to, La, Gd, Sm, Lu, Yb, Er, Pr, Pm, Dy, Ho, Eu and mixtures thereof, and a solvent. Representative salts of rare earth elements include, but are not limited to, hafnium nitrate, hafnium chloride or other hafnium salts soluble in the solvent and aqueous solution of the slurry as well. The salt of the rare earth element will react with the solvent to form an oxide of the rare earth metal. The precursor solution may permeate and deposit precursor particles in the pores of the top barrier coating. Upon heat treating the dipped substrate as shown at step 7 in FIG. 4A, the oxide of the rare earth metal will form in the pores and densify the top barrier coat layer 16. The dipped substrate may be heat treated at a temperature of about 500° C. to about 700° C., and preferably at a temperature of about 600° C., for about 30 minutes to about 90 minutes, and preferably for about 60 minutes. Once heat treated, steps 6 and 7 in FIG. 4A may be repeated until the desired density of the top barrier coating is achieved.

Referring now to an alternative embodiment illustrated in FIG. 4B, the silicon substrate may be provided as shown in step 1, coated with an optional bond coat layer 12 as shown in step 2, coated with an optional intermediate coat layer 14 as shown in step 3, all as described above, and dipped in a combination of the slurry described herein and precursor solution described herein as shown in step 4, rather than the aforementioned slurry alone. The coated substrate may then be cured as described above in step 5, and steps 4 and 5 may be repeated to deposit a second and successive layer(s) of top barrier coating material upon the first layer of top barrier coating. At steps 6 and 7 of FIG. 4B, the substrate may then dipped in the aforementioned precursor solution as described above and heat treated as described above. Once heat treated, steps 6 and 7 in FIG. 4B may be repeated until the desired density of the top barrier coat layer 16 is achieved.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A method for depositing a protective coating on a complex shaped substrate, comprising the steps of:
    (1) forming a base coat on a complex shaped substrate comprising a gas turbine engine component by dipping said complex shaped substrate into a slurry consisting of an aqueous solution, at least one refractory metal addition of at least 25 mol. % of a first refractory metal oxide selected from the group consisting of hafnium oxide and monoclinic hafnium oxide and up to about 25 mol. % of at least one second refractory metal oxide, a dispersing agent in an amount no more than 50 percent weight of the slurry, and at least one transient fluid additive being a source of silica or titania, said transient fluid additive being present in an amount of about 0.1 percent to 10 percent by weight of said slurry and being used to promote grain growth and eliminate the formation of pores between grains;
    (2) curing said dipped substrate, wherein curing comprises heating said substrate to a temperature of between about 1250° C. to 1450° C. for about 30 minutes to 500 minutes;
    (3) dipping said substrate into a precursor solution to form a top barrier coat thereon; and
    (4) heat treating said dipped, cured substrate to form a protective coating.

2. The method of claim 1, further comprising applying an optional bond coat disposed between said substrate and an optional intermediate layer of said substrate prior to dipping said substrate into said slurry.

3. The method of claim 1, further comprising repeating steps (1) and (2) to achieve two or more layers of a base coat on said substrate.

4. The method of claim 1, further comprising repeating steps (3) and (4) to achieve a predetermined density in said protective coating.

5. The method of claim 1, wherein said precursor solution comprises a salt of a rare earth element and a solvent.

6. The method of claim 1, wherein steps (1) and (3) are performed before performing step (2).

7. The method of claim 6, wherein steps (1) and (3) are repeated in succession before performing step (2).

8. The method of claim 1, wherein step (2) is performed after performing step (1).

9. The method of claim 1, wherein step (2) is performed after performing steps (1) and (3) in succession.

10. The method of claim 1, wherein heat treating comprises heating said substrate to a temperature of between about 500° C. to 700° C. for about 30 minutes to 90 minutes.

11. The method of claim 1, wherein step (4) is performed after performing step (2).

12. The method of claim 1, wherein steps (3)-(4) are repeated until achieving a desired density in said protective coating on said substrate.

13. The method of claim 1, wherein said at least one second refractory metal oxide comprises a metal selected from the group consisting of zirconium, titanium, niobium, tantalum, cerium, yttrium, scandium, aluminum, silicon, lanthanum, gadolinium, samarium, luteium, ytterbium, europium, praseodymium, dysprosium, erbium, promethium, holmium and mixtures thereof.

14. The method of claim 1, wherein said transient fluid additive comprises at least one silica based material selected from the group consisting of silicon oxide, lithium silicate, fumed silica powder and colloidal silica.

15. The method of claim 1, wherein said transient fluid additive comprises at least one titania based material.

16. The method of claim 1, wherein said gas turbine engine component comprises integral vane rings and integrally bladed rotors.

17. The method of claim 1, wherein said substrate contains silicon and said transient fluid additive is lithium silicate which decomposes to form silicon oxide that reacts with the hafnium oxide forming a layer of hafnium silicate between the grains of hafnium oxide as well as between the hafnium oxide and the silicon in the substrate.

18. The method of claim 1, wherein said at least one refractory metal addition further includes no more than 75 mol % of at least one refractory metal oxide having a metal selected from the group consisting of Zr, Ti, Nb, Ta, Ce and mixtures thereof, balance hafnium oxide.

19. The method of claim 1, wherein said at least one refractory metal addition further includes no more than 75 mol % of at least one metal oxide selected from the group consisting of Y, Sc, Al, Si and mixtures thereof, balance hafnium oxide.

* * * * *